(12) United States Patent
Okezie

(10) Patent No.: US 10,347,107 B1
(45) Date of Patent: Jul. 9, 2019

(54) METHOD AND APPARATUS FOR AVOIDING TRAFFIC CASUALTIES

(71) Applicant: Pathfins C. Okezie, Piscataway, NJ (US)

(72) Inventor: Pathfins C. Okezie, Piscataway, NJ (US)

( * ) Notice: Subject to any disclaimer, the term of this patent is extended or adjusted under 35 U.S.C. 154(b) by 0 days.

(21) Appl. No.: 16/027,054

(22) Filed: Jul. 3, 2018

(51) Int. Cl.
| *B60Q 1/00* | (2006.01) |
| *G08B 21/02* | (2006.01) |
| *B60R 25/24* | (2013.01) |
| *B60Q 9/00* | (2006.01) |
| *B60R 25/102* | (2013.01) |

(52) U.S. Cl.
CPC ............... *G08B 21/02* (2013.01); *B60Q 9/00* (2013.01); *B60R 25/102* (2013.01); *B60R 25/241* (2013.01)

(58) Field of Classification Search
None
See application file for complete search history.

(56) References Cited

U.S. PATENT DOCUMENTS

| 6,219,439 | B1 | 4/2001 | Burger |
| 6,224,109 | B1 | 5/2001 | Yang |
| 6,437,690 | B1 | 8/2002 | Okezie |
| 6,617,707 | B1 | 9/2003 | Reece |
| 6,679,425 | B1 | 1/2004 | Sheppard et al. |
| 6,857,210 | B2 | 2/2005 | Santa Cruz |
| 6,923,370 | B2 | 8/2005 | Gotfried et al. |
| 7,013,365 | B2 | 3/2006 | Arnouse |
| 7,880,601 | B2 * | 2/2011 | Okezie .................... B60R 22/48 340/3.1 |
| 2002/0095587 | A1 | 7/2002 | Doyle et al. |
| 2003/0200227 | A1 | 10/2003 | Ressler |
| 2005/0137987 | A1 | 6/2005 | May et al. |
| 2013/0271275 | A1* | 10/2013 | Schalk ............... H04M 1/72538 340/438 |
| 2015/0061856 | A1* | 3/2015 | Raman .................. G08B 21/24 340/457 |
| 2016/0019785 | A1* | 1/2016 | Zhang ................ G01C 21/3423 340/905 |
| 2016/0297324 | A1* | 10/2016 | Taylor .................... B60N 2/002 |
| 2017/0116839 | A1* | 4/2017 | Friedman ........... G08B 21/0283 |

* cited by examiner

*Primary Examiner* — Julie B Lieu
(74) *Attorney, Agent, or Firm* — Walter J. Tencza, Jr.

(57) ABSTRACT

An apparatus including a motor vehicle; a computer processor; a computer memory; a speaker; and a switch responsive to opening of a door of the motor vehicle. The computer processor, computer memory, speaker, and switch are fixed to the motor vehicle. The computer processor executes computer software stored in the computer memory to cause the speaker to emit a sound message, indicating that a driver should not text and drive, in response to the activation of the switch upon opening of the door of the motor vehicle. Further a combination apparatus including a civilian driver's license apparatus; and a master driver's license apparatus; wherein the master's license apparatus is configured to come in close proximity to the civilian driver's license apparatus to enable the civilian driver's license apparatus to operate a motor vehicle.

2 Claims, 4 Drawing Sheets

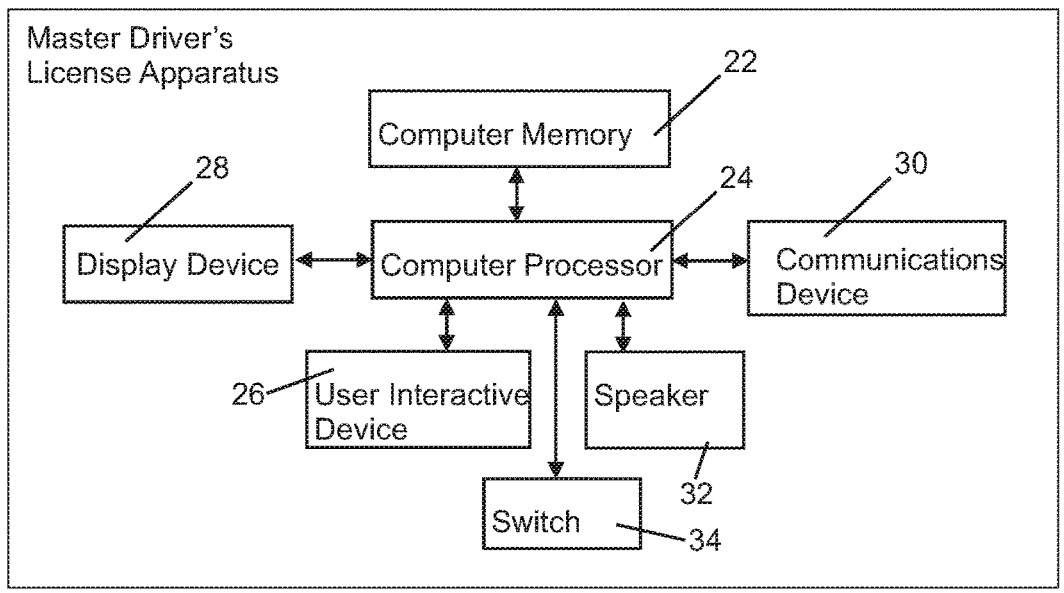
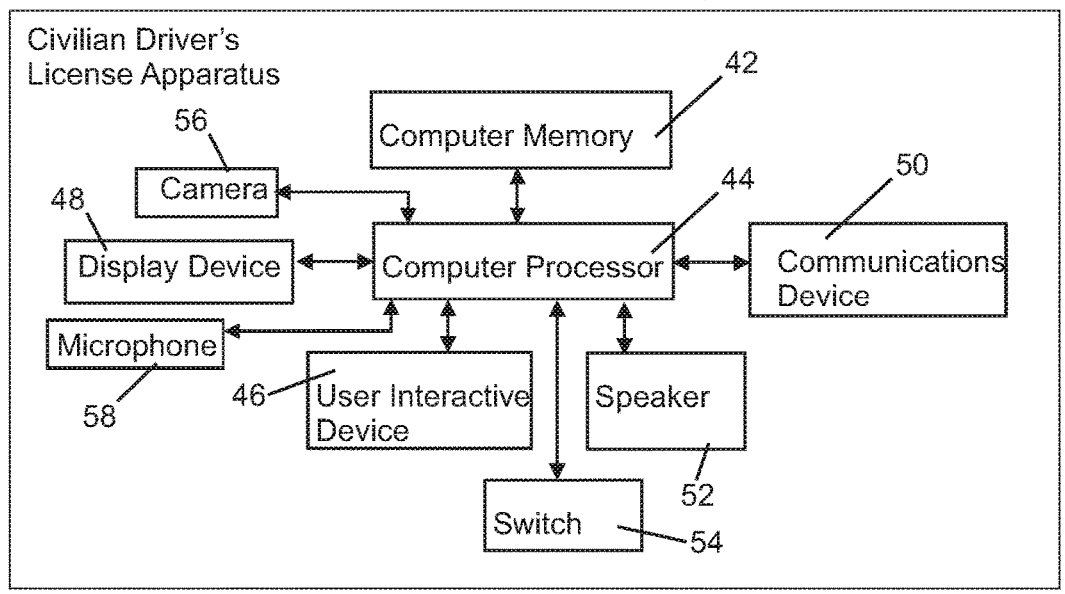

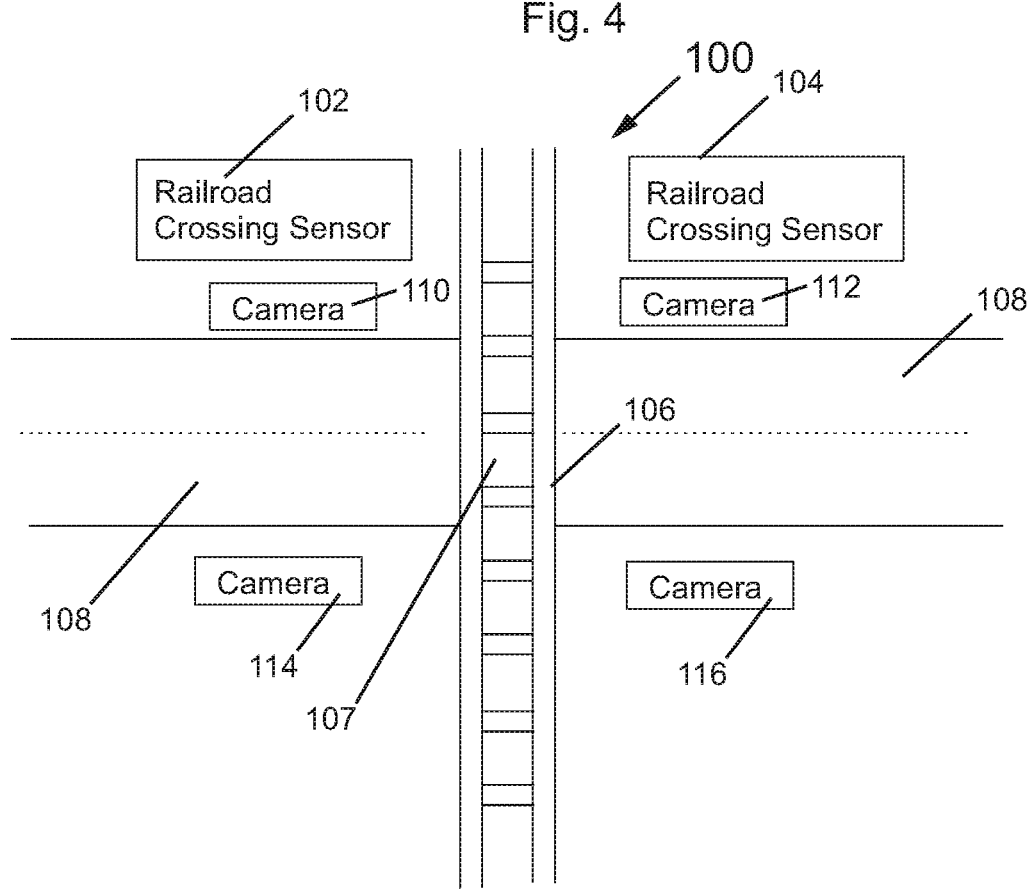

US 10,347,107 B1

METHOD AND APPARATUS FOR AVOIDING TRAFFIC CASUALTIES

FIELD OF THE INVENTION

This invention relates to various methods and apparatus for avoiding traffic casualties, and generally for making individual's lives safer.

BACKGROUND OF THE INVENTION

Sending text messages, receiving text messages, calling and receiving cell phone calls while operating a vehicle do not mix or go together. It is like mixing fuel and matches together. You get a massive explosion. The consequences of texting, calling on your cell phone and receiving phone calls while operating a vehicle is very dangerous. You cannot focus, concentrate on the road and that's a recipe for disaster. The consequences can be fatal. We do not have nine lives to live but just one life and we should cherish that life dearly.

The national safety council reports that cell phone use while driving leads to 1.6 million crashes each year. Nearly 330,000 (three hundred and thirty thousand) injuries occur each year from accidents caused by texting while walking. One out of every four car accidents in the United States is caused by texting and driving.

Road rage is another problem today's drivers face. Studies have shown about 80% of all motorists exhibits some type of road rage at one time or the other. A disturbing eight (8,000,000) million motorist act on impulse to road rage causing harm to other motorists, their vehicle and sometimes may result in some fatalities. Road rage is defined as aggressive driving or a motorist that does obey traffic rules and regulations; and if these types of traffic behavior go unchecked there will be no orderliness on our roads and highways. Sometimes road rage starts by one motorist yelling at the other motorist for unknown reasons or tail gaiting the vehicle ahead of you.

Another area of driver safety concern are rail road crossings. There are over 25,000 (twenty five thousand) rail road crossings in our country, and there have been many instances of trains and automobile collisions at rail road crossings that results in loss of lives and damage to properties.

An additional safety problem is people falling asleep while driving. According to an American Automobile Association (AAA) study about forty-one (41%) of motorists fall asleep while driving. In some instances this can be linked to drinking and driving. In addition, many people drive while in a drowsy state. Over five thousand motorists and non-motorists lose their lives each year due to drowsy drivers or drivers that fall asleep.

A further vehicle safety problem occurs at crosswalks. Too many lives have been lost at crosswalks in major cities. Pedestrians are killed by a vehicle while trying to cross to the other side of the street in the crosswalks.

Drinking alcohol and driving is another vehicle safety issue. Alcohol affects the vehicle operator's concentration, vision, memory and reflexes which are needed to be an effective automobile operator. If the vehicle operator does not have the highest level memory, concentration, and attention his/her ability to be an effective operator of an automobile will be compromised and he/she is very likely to get involved in an automobile accident.

Auto theft has been one of the major challenges facing the automobile industry in countries around the world since the invention of the automobile. One of the reasons why car thieves are always a step or two ahead of the auto industry is due to the so called "automatic car door opener." This device once pressed against the door of any vehicle causes the vehicle's doors to automatically unlock and the car thieves can have easy access to the vehicle. Thereafter the thieves can "hot wire" the vehicle and get the vehicle ignition system started running and they can easily drive away, steal the vehicle in a relatively short time period. U.S. Pat. No. 7,880,601, to Okezie, prevents hot wiring of a vehicle. However, someone could pop the hood and jump start the car to steal.

Generally, U.S. Pat. No. 7,880,601 to Okezie provides various motor vehicle safety features and is incorporated by reference herein.

SUMMARY OF THE INVENTION

In at least one embodiment, an apparatus is provided comprising a motor vehicle; a computer processor; a computer memory; a speaker; and a switch responsive to opening of a door of the motor vehicle. The computer processor, computer memory, speaker, and switch are fixed to the motor vehicle, in at least one embodiment. The computer processor executes computer software stored in the computer memory to cause the speaker to emit a sound message in response to the activation of the switch upon opening of the door of the motor vehicle, in at least one embodiment. The sound message may indicate that a driver should not text on a cell phone and drive.

In at least one embodiment, a combination apparatus is provided comprising a civilian driver's license apparatus; and a master driver's license apparatus; wherein the master's license apparatus is configured to come in close proximity to the civilian driver's license apparatus to enable the civilian driver's license apparatus to operate a motor vehicle.

In at least one embodiment, an apparatus is provided comprising a computer processor; a computer memory; a communications device; and a camera; and wherein the computer processor in accordance with computer software stored in computer memory is configured to monitor a first person's behavior via the camera, and if the behavior includes driving a motor vehicle and engaging in a physical confrontation with a second person while driving the motor vehicle or shortly after driving the motor vehicle, sending a message to a law enforcement official device indicating characteristics of the first person and characteristics of the motor vehicle.

In at least one embodiment, a method is provided comprising using a computer processor programmed by computer software stored in computer memory to cause a sound message to be emitted from a speaker in response to the activation of a switch upon opening of a door of a motor vehicle; and wherein sound message indicates that a driver should not text on a cell phone and drive; and wherein the computer processor, computer memory, speaker, and switch are fixed to the motor vehicle.

In at least one embodiment another method is provided of causing a civilian driver's license apparatus, and a master driver's license apparatus to come into close proximity. The master driver's license apparatus may be programmed by computer software to enable the civilian driver's license apparatus to operate a motor vehicle, when the master driver's license apparatus and the civilian driver's license apparatus are in close proximity.

In at least one embodiment another method is provided of using a computer processor in accordance with computer software stored in computer memory to monitor a first person's behavior via a camera; and if the behavior includes driving a motor vehicle and engaging in a physical confrontation with a second person while driving the motor vehicle or shortly after driving the motor vehicle, using the computer processor and a communications device to send a message to a law enforcement official device indicating characteristics of the first person and characteristics of the motor vehicle.

BRIEF DESCRIPTION OF THE DRAWINGS

FIG. 2 shows a simplified block diagram of a master driver's license apparatus in accordance with an embodiment of the present invention;

FIG. 3 shows a simplified block diagram of a civilian driver's license apparatus in accordance with an embodiment of the present invention;

FIG. 4 shows a simplified diagram of a railroad crossing and various devices in accordance with an embodiment of the present invention;

DETAILED DESCRIPTION OF THE DRAWINGS

Figure 1:
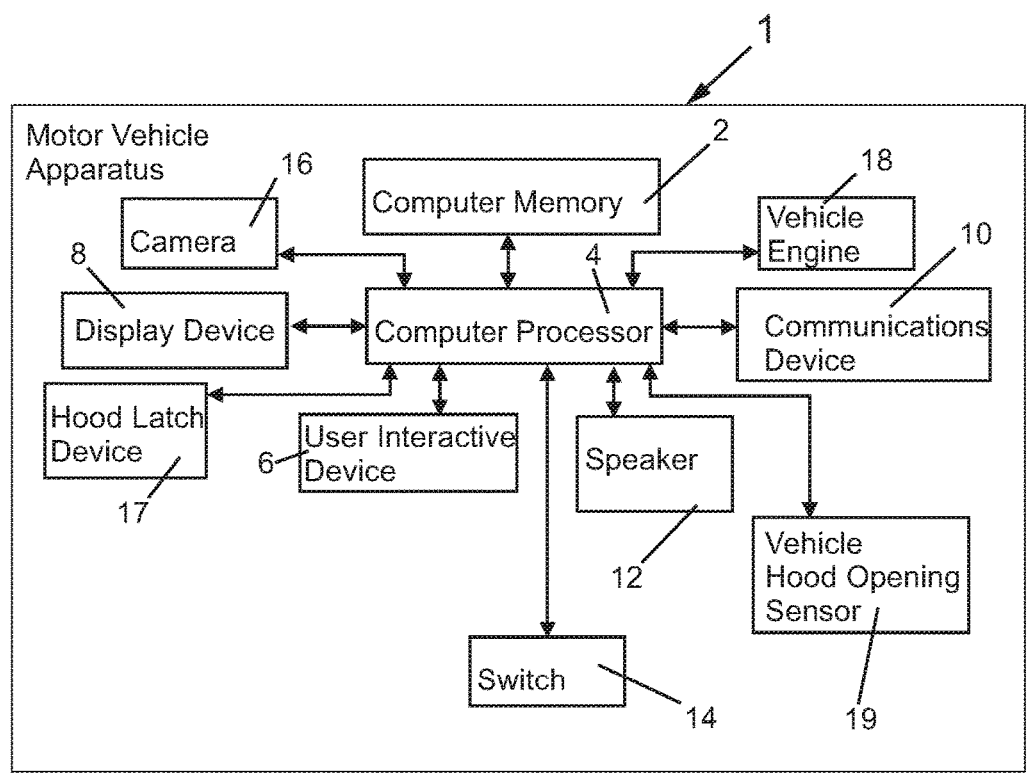
FIG. 1 shows a simplified block diagram of a motor vehicle apparatus in accordance with an embodiment of the present invention.

FIG. 1 shows a simplified block diagram of a motor vehicle apparatus 1 in accordance with an embodiment of the present invention. The motor vehicle apparatus 1 may include a computer memory 2, a computer processor 4, a user interactive device 6, a display device 8, a communications device 10, a speaker 12, and a switch 14 for triggering a voice message. The components 2, 6, 8, 10, 12, and 14 communicate with the computer processor 4 via communications links.

The motor vehicle apparatus 1 may include and/or be attached to and/or integrated with a motor vehicle, such as a car or automobile. The motor vehicle may be any known motor vehicle generally including one or more door's such as a driver's side door.

In accordance with one or more embodiments of the present invention, before any vehicle operator starts his/her vehicle, there will be at least one recorded warning, which may be playable by the computer processor 4 automatically in response to, for example, triggering of the switch 14. The switch 14 may be triggered, for example, upon opening of the driver's side door, or upon a driver sitting in the driver's seat. The switch 14, when trigger, may cause a sound message to be played by the computer processor 4 emitted through the speaker 12. The sound message may be an anti-phone-texting while driving message such as: "Warning: Do not drive your vehicle while sending text messages or viewing text messages on your phone".

The sound message may also be an anti-phone calling or answering while driving message, such as "Do not make or receive phone calls while operating your vehicle because it can result in a fatal accident."

The sound message may state consequences of texting while driving or making or receiving phone calls while driving.

For example the sound message may state:
"The consequences may be that your digital driver's license will be temporarily be suspended and you will may also pay fines. You do not want to go through these inconveniences, do you? Please play it safe. Do not text, review text messages or call or answer phone calls on your cell phone while operating a vehicle. If you want to text or review texts, please pull over to a safe area and turn off your vehicle engine and then make your phone call or send or receive text messages safely. When you are done you can then proceed on your way to your destination happily."

FIG. 2 shows a simplified block diagram of a master's driver's license (MDL) apparatus 20 in accordance with an embodiment of the present invention. The MDL apparatus 20 may include a computer memory 22, a computer processor 24, a user interactive device 26, a display device 28, a communications device 30, a speaker 32, and a switch 34 for triggering a voice message. The components 22, 26, 28, 30, 32, and 34 communicate with the computer processor 24 via communications links.

FIG. 3 shows a simplified block diagram of a civilian's driver's license apparatus 40 in accordance with an embodiment of the present invention. The civilian driver's license apparatus 40 may include a computer memory 42, a computer processor 44, a user interactive device 46, a display device 48, a communications device 50, a speaker 52, and a switch 54 for triggering a voice message. The components 42, 46, 48, 50, 52, and 54 communicate with the computer processor 44 via communications links.

The MDL apparatus 20 may be used by law enforcement authorities. The user interactive device 26 of the MDL apparatus 20 may include at least one button that when selected by a user sends a signal out via communications device 30, which communicates with civilian driver's license apparatus 40 through communications device 50 to cause computer processor 44 to set a flag in computer memory to make the civilian's driver's license apparatus 40 non functional for starting a car, or operating a motor vehicle, or otherwise invalidate or deactivate the civilian driver's license apparatus 40. The user interactive device 26 of the MDL apparatus 20 can also be selected or toggled to activate or make the civilian driver's license apparatus 40 functional for starting and/or operating a motor vehicle.

The civilian driver's license apparatus 40 may be deactivated or made non functional by a central controller from for example a division of motor vehicles of a state. Similarly a motor vehicle of the motor vehicle apparatus 1 may be made non operational and non drivable by a signal from a center controller from, for example, a division of motor vehicles of a state.

In at least one embodiment, once a civilian vehicle operator driver's license is temporarily suspended for violating the laws of texting or using cell phones while operating a vehicle the suspended digital driver's license apparatus 40 will not be able to restart his/her vehicle, such as vehicle apparatus 1, once the driver's license is deactivated and will need a police patrol officer with a master driver's license, such as MDL apparatus 20 to reactivate the suspended civilian digital driver's license apparatus 40 or enable it to be apple to start vehicle apparatus 1, that has been deactivated or suspended, for example, by touching the sensors or buttons of user interactive device 26 on the master's driver's license apparatus 20 to sensor or buttons of user interactive device 46 of the civilian driver's license apparatus 40.

In at least one embodiment, the civilian driver's license apparatus 40 may be an electronic key, and a driver/motorist, in at least one embodiment, will not be able to operate his/her vehicle of the vehicle apparatus 1, once the driver's license apparatus 40 is deactivated.

In a least one embodiment, the user interactive device 46 of the civilian driver's license apparatus 40 may include a reactivation button or sensor that the police patrol officer can touch or contact with his/her button or sensor of user interactive device 26 of master driver's license apparatus 20 to reactivate the civilian's driver's license apparatus 40 so that it can operated the motor vehicle apparatus 1.

The master's driver's license apparatus 20 may issue a citation to appear in court/pay a fine for a texting or participating in a phone call while driving violation, such as electronically through communications device 30 or through a printer, which may be part of user interactive device 26. Also, the computer processor 24 of MDL 20 may be programmed to send out a message via communications device 30 to nearby police patrol officers to notify them of the exact location of the civilian driver's vehicle.

The MDL apparatus 20 may have a housing in which the components 22, 24, 26, 28, 30, 32, and 34 are located. The housing of the MDL apparatus 20 may be colored blue to represent law enforcement. The user interactive device 26 of the MDL apparatus 20 may include a red button or red sensor, and a green button or green sensor. To reactivate a civilian driver's digital license apparatus 40 that has been made inoperable, in at least one embodiment, the patrol police officer has to touch, clamp together/kiss the green button or sensor of the user interactive device 26 of the MDL apparatus 20 to a similar or identical button or sensor of the user interactive device 46 of the civilian driver's license apparatus 40, until the green portion of the user interactive device 26 of the master driver' license apparatus 20 lights up lit bright green showing that the civilian driver's license apparatus 40 has been reactivated.

However, if the police officer's master driver's license apparatus 20 fails to reactivate the civilian vehicle operator's digital driver's license apparatus 40 the red light of the user interactive device 26 of the MDL 20 will light up bright red, or remain lit up bright red.

The driver of the civilian driver's digital driver's license apparatus 40 will be advised to try to re-start his/her vehicle of vehicle apparatus 1 to make sure that the civilian driver's license is now functional, and a citation, in at least one embodiment, will be issued for the violation, such as through communications device 30 by for example, email, or through a printer of user interactive device 26.

In at least one embodiment of the present invention, the civilian driver's license apparatus 40 may be, or may include, a known cell phone, such as an IPHONE (trademarked) which has been programmed by a computer application or program in accordance with the present invention.

The civilian driver's license apparatus 40 may be programmed by computer software to detect when an individual is driving a car and sending or attempting to send texts, reviewing text messages, or is engaged in a telephone conversation, and may cause by computer processor 44, the telephone call to be ended or the text feature to be disabled so that the individual can no longer text or make a phone call while the motor vehicle, such as of motor vehicle apparatus 1, is operating.

Conversely, if the motorist parks his/her vehicle, such as motor vehicle apparatus 1, and turns off the vehicle ignition system, the civilian driver license apparatus 40 will detect that state, such as through communications device 50 receiving a signal from communications device 10 of the motor vehicle apparatus 1. The computer processor 44 may be programmed to enable the phone calling features and texting features of civilian driver license apparatus 40, upon detecting that the motor vehicle of motor vehicle apparatus 1 is not operating.

In addition, in at least one embodiment, the civilian digital driver's license apparatus 40 will be temporarily deactivated and any nearby police patrol officer will be alert in his/her police vehicle as to the exact location of the motorist with a temporarily deactivated driver's license for violating the law of not driving and texting on your cell phone at the same time. The police officer can reactivate the motorist temporarily suspended driver's license apparatus 40 with the police officer's master driver's license apparatus 20 and a summons/citation may be issued to this motorist for the violation.

In at least one embodiment, the computer processor 44 of the civilian driver's license apparatus 40 may be programmed to prevent someone from walking and texting or walking and participating in a phone call. In at least one embodiment, whenever a pedestrian begins to "walk and text" on his/her cell phone the "lock the keyboard" computer programming of computer processor 44 may be programmed to lock, jam or paralyzed the cell phone keyboard so that the pedestrian is not able to complete any sentence on the cell phone keyboard of user interactive device 46. This is to frustrate the pedestrian to give up walking and texting on the cell phone simultaneously. However, if the pedestrian is in a seated position or in a stationary relaxed position the "anti-lock" key board sensors will be activated so that he/she can then text his/her message and with this technology many lives will be saved.

In at least one embodiment, road rage can be reduced. Each motorist may be mandated to drive his/her vehicle with his/her cell phone or civilian diver's license apparatus 40 including, in at least one embodiment, a digital driver's license reader, and in at least one embodiment, the computer processor 44 is programmed to know the exact location of every vehicle operator in the vicinity. When a particular motorist exhibits "road rage" his/her cell phone and/or civilian driver's license apparatus 40 will be able identify this road rage, and his/her location on the road/highway. If he/she is heading east or west on the highway, the color, brand of his/her vehicle and all other personally identifying features of the road rager and his/her vehicle, and all this information will be transmitted via communications device 50 and communications device 30 (or analogous for other officers) to all master driver's license apparatus 20 or all police patrol officers within a certain radius, such as 10 blocks, such as to computer processor 24 of the master driver's license apparatus 20.

The police officers, each of whom has a master's license apparatus 20, may then proceed to the scene of the road rage and deal with the situation in an expeditious manner.

FIG. 4 shows a diagram 100 in accordance with another embodiment of the present invention, including railroad crossing sensors 102 and 104, railroad crossing or tracks 106, and a motor vehicle road 108 which goes over or through the crossing or tracks 106.

The railroad crossing sensor 102 is an active sensor and the railroad crossing sensor 104 is a backup auxiliary sensor, that is automatically activated whenever the active sensor 102 malfunctions or breaks down. Also facing either side of the railroad tracks 106.

In at least one embodiment, the diagram 100 shows cameras 110 and 112 facing one direction down the tracks 106, and cameras 114 and 116 facing down the opposite direction of the tracks 106. The cameras 110 and 114 may be on the same iron bar as the railroad cross sensor 110. The cameras 112 and 116 may be on the same iron bar as the railroad cross sensor 104.

Camera 110 may be active and camera 112 pointing in the same direction down the tracks may be a backup. Camera 114 may be active and camera 116 pointing down the opposite direction (opposite form cameras 110 and 112) may be a backup. The cameras 110, 112, 114, and 116 may communicate with the driver's license apparatus 40 via communications device 50 so that the computer processor 44 may receive input from the communications device 50 and display images taken by cameras 110, 112, 114, and 116 on display device 48 on the dashboard of a vehicle, such as of motor vehicle apparatus 1.

As a train approaching the rail road crossing 107 (where road 108 crosses track 106) from about a distance of one mile to the crossing 107, in at least one embodiment, the computer processor 44 of the driver's license apparatus 40 may be programmed to display a picture of the approaching train on the monitor or display device 48 of the driver's license apparatus 40 on the vehicle of motor vehicle apparatus 1.

In addition, the railroad crossing sensor 102 and/or 104 emit signals which are received by driver's license apparatus 40 and the computer processor 44 of the driver's license apparatus 40 is programmed to cause a warning message to be emitted from the speaker 52 which may be for example: "You are approaching the railroad cross. Please slow down and be prepared to stop for the approaching train until the train goes through or passes the rail road crossing and the bar is lifted up and the red lights stop blinking. Then you can proceed with caution. This is for your own safety."

In at least once embodiment, the civilian driver's license apparatus 40 may be or may include a cell phone having a camera 56 and a microphone. The camera 56 and/or other sensors of the user interactive device 46 may monitor the driver of a vehicle to determine when he/she falls asleep while operating a vehicle. The microphone 58 may receive sound inputs which indicate that the driver is snoring, and relay these sound inputs to the computer processor 44. Other sensors of the user interactive device 46 may also sense when the driver is snoring.

In general, in at least one embodiment, a motor vehicle of the motor vehicle apparatus 1 will not operate unless the civilian driver's license apparatus 40 is within close proximity of the motor vehicle. U.S. Pat. No. 7,880,601 B2 to Pathfins C. Okezie is incorporated by reference herein.

In at least one embodiment, if the civilian driver's license apparatus 40 senses that a driver is sleeping, such as through camera 56, or snoring, such as through microphone 58, while the vehicle of motor vehicle apparatus 1 is operating, the computer processor 44 is programmed to cause a ring sound or other sound alarm to be emitted from the speaker 52 to wake up the driver. There may also be a sound message such as: "Please remember you cannot sleep/snooze and drive. It is against the law. If you continue to sleep/snooze and drive your vehicle law enforcement officers within five blocks (5) radius of your vehicle will be alerted and you will be ticketed. If you are tired, look for a rest area, safe place, gas station, then park and have some rest before proceeding with your journey."

In at least one embodiment, If the driver continues to sleep and/or snore while operating the motor vehicle a nearby police officer will be alerted by signals, as programmed by computer program stored in the computer memory 42, executed by the computer processor 44 through the communications device or link 50. The signals transmitted to the police officers may identity of the driver, make, model, color, and description of the motor vehicle of the motor vehicle apparatus 1, and may be displayed on the police patrol officer's monitor, such as on display device 28 of the master driver's license apparatus 20 shown in FIG. 2, along with the GPS (global positioning satellite) location. The signals sent to the police officer(s) from civilian driver's license apparatus 40 through communications device 50 may direct the police officer(s) to the exact location of the driver so that he/she will be removed from the roads/highways and be ticketed for driving while impaired by drowsiness or while sleeping.

Figure 5:
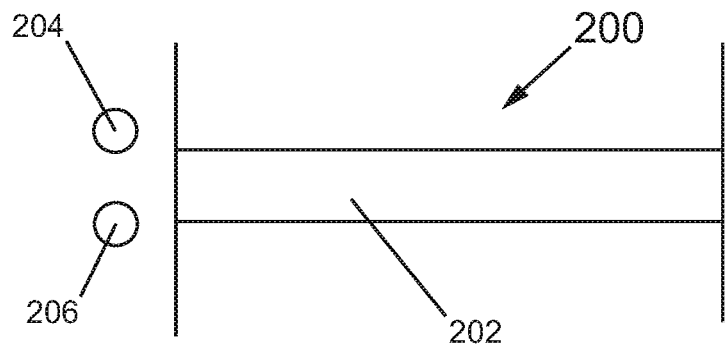
FIG. 5 shows a simplified diagram of a crosswalk and various devices in accordance with an embodiment of the present invention.

In at least one embodiment of the present invention, the civilian driver's license apparatus 40 is configured to prevent pedestrians' deaths on our nation's crosswalks. FIG. 5 shows a simplified diagram 200 of a crosswalk 202, and signal emitting devices, sensors, or beacons 204 and 206. The device 206 may be a backup device and the device 204 a primary device. The device 204 may be active and the device 206 may be a backup so that if the active device 204 dies or malfunctions the back-up automatically is activated. The devices 204 and 206 may be attached to a permanent or semi-permanent pole on a side of the street crosswalk 202.

The communications device 50 of the civilian driver's license apparatus 40 may receive signals from the device 204 or 206, and when crosswalk detection signals are received from devices 204 or 206, the computer processor 44 may cause a sound message to be played which may be: "You are approaching a crosswalk. Drive slowly and be prepared to stop for the pedestrians crossing the crosswalk".

Figure 6:
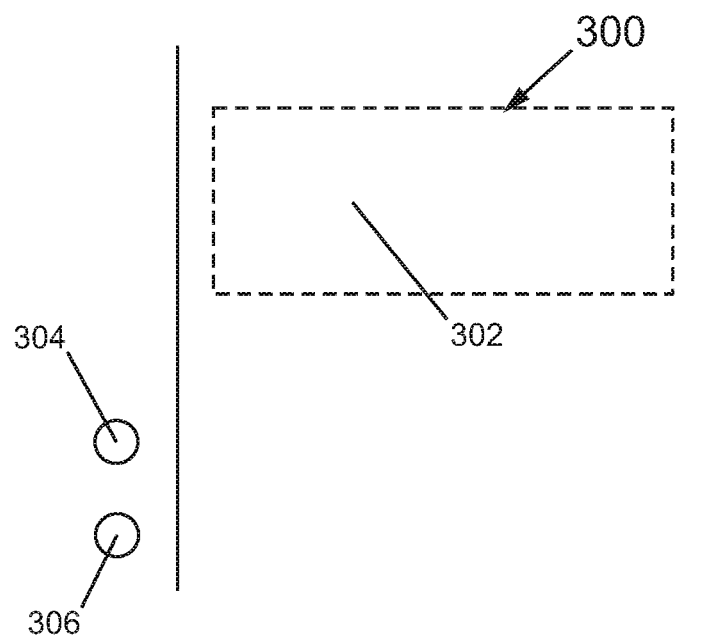
FIG. 6 shows a simplified diagram of a work area and various devices in accordance with an embodiment of the present invention.

In at least one embodiment, a workplace alert system is provided, such as a PSE&G (trademarked) (Public Service Electric and Gas), workplace site alert system. FIG. 6 shows a diagram 300 of a workplace or work site 302 (shown by dashed lines), and devices, sensors, or beacons 304 and 306. The device 304 may be a primary device and the device 306 may be a backup device. The devices 304 and 306 may be attached to a portable stand that is located or placed about a block before the work site 302.

The communications device 50 of the civilian driver's license apparatus 40 may receive signals from the device 304 or 306, and when work place signals are received from devices 304 or 306, the computer processor 44 may cause a sound message to be played through speaker 52 which may be: "There is work site ahead. Please drive slow and be prepared to stop".

In at least one embodiment, the computer memory 42 of the civilian driver's license apparatus 40 may include facial recognition computer software which is employed through the camera 56 by the computer processor 44. The computer processor 44 may determine if a potential driver of the motor vehicle of motor vehicle apparatus 1, is the correct driver and only permit operation of the vehicle or turning on the ignition if the facial recognition software detects the correct driver.

In at least one embodiment, if the motor vehicle of motor vehicle apparatus 1 is lifted from the ground, a camera 16 of the motor vehicle apparatus 1 is activated by the computer processor 4 as programmed by the computer memory 2 to take pictures or video of the towing truck and the driver of the towing truck from the time towing of the vehicle is started to a time when the motor vehicle of motor vehicle apparatus 1 is discharged or dropped from the towing truck. The computer processor 4 may also be programmed by computer processor 4 to send an email to the vehicle owner through communications device 10 to civilian driver's license apparatus 40 via communications device 50 and to a police station and/or to master driver's license apparatus 20.

The civilian driver's license apparatus 40 may be configured to monitor the operator's state in terms of whether they are intoxicated from alcoholic beverages and whether they are drinking. In at least one embodiment, as soon as the vehicle operator puts any cup, bottle near his/her mouth, it will be detected by the camera 56 on the apparatus 40. The computer memory 42 may be programmed by computer software to detect by use of computer processor 44 and camera 56 the placing of a cup next to the operator's mouth while the operator is driving, and a pre-recorded voice will say something like this is to the vehicle operator:

"It is illegal to drink alcoholic beverages while operating a vehicle and if you drink alcoholic beverages prior or while operating a vehicle I will alert a nearby police patrol officer and you will be pulled over for a breathalyzer test. The facial recognition device/camera is watching you."

The camera 56 may be placed on a dashboard of a vehicle, such as the motor vehicle of the motor vehicle apparatus 1.

In operation, the civilian driver's license apparatus 40 may transmit a drinking while driving signal via communications device 50 as executed by the computer processor 44 due to programming in computer memory 42 to a police station or to master driver's license apparatus 20. The facial recognition software may be programmed to detect whether beverages is non alcoholic.

In at least one embodiment, the worksite 302 of FIG. 6 may be replaced by or may be a residential neighborhood, or a neighborhood with children. The devices 304 and 306 may send signals which are received by civilian driver's license apparatus 40 to get driver's to slow down in residential or other crowded pedestrian traffic areas.

The communications device 50 of the civilian driver's license apparatus 40 may receive signals from the device 304 or 306, and when residential neighborhood or children at play signals are received from devices 304 or 306, the computer processor 44 may cause a sound message to be played through speaker 52 which may be: "There is residential neighborhood, children at play area, or crowded pedestrian traffic area. Please drive slow and be prepared to stop".

Generally, outdoor devices, such as sensors 102 and 104 in FIG. 4, cameras 110, 112, 114, and 116 in FIG. 4, devices 204 and 206 in FIG. 5, and devices 304 and 306 in FIG. 6, are typically configured to be water proof.

In at least one embodiment, if any vehicle, such as of motor vehicle apparatus 1, is parked and the vehicle's engine continues to run for about thirty (30) minutes, the computer processor 4 is programmed to shut off the vehicle's engine 18 automatically and the digital driver's license apparatus 40 will then be temporarily be deactivated by a signal from communications device 10 to communications device 50 so that civilian driver's license apparatus 40 acts as a key which has been deactivated and does not allow the staring of the motor vehicle of motor vehicle apparatus 1. In addition, the civilian driver's license apparatus 40 or the motor vehicle apparatus 1 may send signals to master license apparatus 20 to cause law enforcement to send a ticket to the civilian driver's license apparatus 40 upon reactivation of the temporarily suspended digital driver's license apparatus 40.

In at least one embodiment, as shown in FIG. 1, there is a vehicle hood opening sensor or device 19. In at least one embodiment, the civilian driver's license apparatus 40 may emit a signal, such as through communications device 50, which may be received by the vehicle hood opening sensor or device 19, and the computer processor 4 may receive this from the sensor 19, and causes a hood latch device 17 to release to open the hood of the vehicle of the motor vehicle apparatus 1. Instead of the civilian driver's license apparatus 40, a mechanic or auto shop may have a device for being sensed by the vehicle hood opening sensor or device 19.

The vehicle hood opening sensor or device 19 may be located at a designated area on the left side of the vehicle of the motor vehicle apparatus 1, above a left front wheel of the motor vehicle. Once the prospective driver/auto shop operator scans/swipes his/her driver's license apparatus, such as apparatus 40, in at least one embodiment, the information on the driver's license, such as in computer memory 42, may be automatically related to a monitoring center or a state's motor vehicle, such as via communications device 50 or communications device 10. At the monitoring center the identity of all of the driver's licenses may be scanned will be saved and may be saved and stored in a computer memory so that the identity of the last person to access the engine of the vehicle, i.e. to open the hood of the motor vehicle of motor vehicle apparatus 1 is on record. In case this vehicle is stolen it can be traced to the last person that opened the vehicle's hood to jump start the vehicle since hot wiring will not longer be possible. They can bypass the hotwiring and use a jumper cable to start the vehicle. With this technology, auto theft will be a thing of the past in the USA and globally.

In at least one embodiment, the vehicle hood opening sensor 19 may be located in the left hand corner of the driver's seat in the vehicle of motor vehicle apparatus 1. The civilian driver's license apparatus 40 or an auto shop apparatus, may be placed near the sensor 19 and/or swipped, to cause the hood latch device 17 to be opened by the computer processor 4. In addition, the identify of the driver having the license apparatus 40 or the auto shop is stored in the computer memory 2 and may be transmitted by communications device 10 to a central monitoring station at a state division of motor vehicles.

In at least one embodiment, whenever a motorist is automatically and temporarily suspended due to the vehicle operator's cell phone usage and texting while operating a vehicle, the driver of the vehicle will be alerted for example by signal(s) from a central monitoring station or from master driver's license apparatus 20 sent to the civilian driver's license apparatus 40 or to the motor vehicle apparatus 1, and a sound message may be emitted on speaker 52 or speaker 12 by computer processor 44 or 4, respectively saying, for example: "Your driver's license has been temporarily suspended due to your violation of the cell phone usage/abuse and texting while operating a vehicle. The vehicle operator is hereby advised to call his/her (municipal) local police for assistance in reactivating the temporarily suspended driver's license." The civilian driver's license apparatus 40 may then be reactivated by, for example, master license apparatus 20.

In at least one embodiment, the civilian driver's license apparatus 40 and/or the motor vehicle apparatus 1 may include facial recognition software and related computer software in computer memory 2 or 42 for use with camera 16 or camera 56 to make sure that young children are not left unattended in a motor vehicle, particularly during hot summer days or cold winter days that may result in injury or death of the young children.

In at least one embodiment, each time the vehicle operator turns off the vehicle ignition, the computer processor 4 may sense that the vehicle engine 18 is off and may be programmed by computer software stored in the computer 2 to play a pre-recorded sound message through speaker 12 which may state: "please make sure that you are not leaving your child/children alone in the vehicle. It is against the law to leave your child/children under the age of ten (10) years alone in the vehicle unattended. If you leave your child/children alone in the vehicle without any supervision for about 2-3 minutes nearby police officer will be alerted automatically electronically and you may end up losing custody of your child/children."

In at least one embodiment, as soon as the vehicle operator leaves his/her vehicle, such as a vehicle of motor vehicle apparatus 1, and shuts the vehicle door/doors the facial recognition software stored in computer memory 2, will automatically do a search of the vehicle as executed by the computer processor 4 through camera 16 to check for occupants. The camera 16 may include a single camera or a plurality of cameras to see the entire inside area.

If the computer processor 4 determines that a child is in the vehicle unattended, the computer processor 4 may be programmed to send an alert and transmit a picture via communications device 10 to a central police station or to master's driver's license apparatus 20 and a police rescue squad will be dispatched to the scene to rescue the child/children that is/are left alone in the vehicle.

A housing of the motor vehicle apparatus 1 may include a designation that "this vehicle is equipped with digital driver license app/device" to alert prospective car thieves that they cannot "hotwire" this vehicle so that their attention can be diverted to easier targets.

In at least one embodiment, the motor vehicle apparatus 1 may have computer software stored in computer memory 2 to determine when the motor vehicle of apparatus 1 is being towed away. The computer software regarding sensing towing may use, at least, the camera 16, the communications device 10, and sensors which may be part of user interactive device 6. When the computer processor 4 determines that the vehicle of apparatus 1 is being towed away, the computer processor 4 may send an alert to the communications device 10 to the cell phone number or e-mail address electronically of the actual owner of the vehicle. The alert may provide information to the vehicle's actual owner's cell phone and or e-mail address including the exact location, the street address of where this vehicle is being towed away to. The alert or message may be in an audio or audio/visual form and may be followed with a question/such or interactive message such as:

"Do you know that your vehicle is being towed away? If yes, please delete. If no, call the police and see the map and the location where your vehicle is being towed to."

In at least one embodiment, when the vehicle of motor vehicle apparatus 1 hits a foreign object, such as another vehicle, the computer processor 4 is programmed to cause the camera 16 to zoom in on an area of the external impact on the vehicle and the camera 16 is able to capture the object or all or most of the identifying feature of the other vehicle such as the other driver's facial appearance, other vehicle license plate, color, model or make of the other vehicle. Video and/or photographs of the other vehicle captured by the camera 16, is programmed by computer software stored in the computer memory 2 to be sent/relayed to the nearby police headquarters monitoring center by computer processor 4 through communications device 10. More than one foreign object can be captured, such as more than two vehicles. Other types of foreign objects, such as pedestrian, animal, or object in the road can also be captured by the camera 16.

The facial recognition computer software stored in computer memory 2 and executed by the computer processor 4 will try to capture as many pictures of the foreign object that hit the outside of the vehicle of motor vehicle apparatus 1.

Sometimes a motor vehicle accident can occur where a vehicle fell into a deep valley or river and the vehicle operator is so unconscious that he/she is not able to call for the ambulance or 911 for help. What do you do in this case? In at least one embodiment, the motor vehicle apparatus 1 has computer software 2 in the computer memory 2 executed by the computer processor 4 which determines if an accident has occurred by use of camera 16, communications device 10, sensors which may be part of user interactive device 6, including global positioning satellite information and/or sensors. If the computer processor 4 detects that an accident has occurred, the computer processor 4 will notify nearby police patrol officers, such as within a twenty blocks radius from the scene of the accident that a vehicle involved in an accident and give the exact time period, location with audio and map drawings of the exact location of the vehicle and that the vehicle operator may be unconscious and that urgent rescue help is needed immediately to save the life of the driver/vehicle operator and/or others, by message from communications device 10. As soon as the police patrol officer/s gets the message they would be able to race to the scene of the accident to provide first aid treatment and call EMS (Emergency medical services) so that the driver may be sent to the hospital for treatment.

In at least one embodiment, every autism or Alzheimer's patient, or severely handicapped patient may be provided with a cell phone and the cell phone camera may be turned on from the monitor that is at the home of the patient. Neither the patient nor any intruder can turn off the cell phone camera from the cell as the cell phone is turned on and off from the monitor at home which could be the computer monitor or a separate monitor that is linked to the cell phone. The patient may carry this cell phone on him inside his/her pocket like any other regular cell phone and the cell phone may have a high powered camera. The cell phone turned on and off from the monitor and as the intruder approaches or attacks/mugs the cell phone inside the patient's wallet automatically captures the facial appearance off the intruder and relays that captured facial appearance of the intruder to the monitoring center. These patients with Alzheimer's and autism spectrum disorders will receive the respect they deserve. With this technology strangers will more likely help patients with this horrible disease. Whenever these patients wanders away from the various homes their loved ones can go to the screen monitor and track the patients down to the exact location/s where they are.

If an assailant/intruder takes or steals this autism/Alzheimer's patient's cell phone his/her facial appearance will be displayed on the monitor at home so that the family of these patients will know who the intruder's assailant/s is or are.

This technology can be a security device for all cell phones. If someone steals your cell phone, the facial appearance will be displayed on the monitor of the cell phone to see the face of the cell phone thief.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
   a motor vehicle;
   a computer processor;
   a computer memory;
   a speaker; and
   a switch responsive to opening of a door of the motor vehicle;
   wherein the computer processor, computer memory, speaker, and switch are fixed to the motor vehicle;
   wherein the computer processor executes computer software stored in the computer memory to cause the speaker to emit a sound message in response to the activation of the switch upon opening of the door of the motor vehicle;
   and wherein sound message indicates that a driver should not text on a cell phone and drive.

2. A combination apparatus comprising
   a civilian driver's license apparatus; and
   a master driver's license apparatus;
   wherein the master's license apparatus is configured to come in close proximity with the civilian driver's license apparatus to enable the civilian driver's license apparatus to operate a motor vehicle.

* * * * *